United States Patent [19]

Hsu et al.

[11] Patent Number: 5,991,430
[45] Date of Patent: *Nov. 23, 1999

[54] METHOD AND DEVICE FOR AUTOMATIC MATCHING OF PLANAR POINT PATTERNS

[75] Inventors: Wen-Hsing Hsu; Shih-Hsu Chang, both of Hsinchu, Taiwan

[73] Assignee: Wen-Hsing Hsu, Hsinchu, Taiwan

[*] Notice: This patent is subject to a terminal disclaimer.

[21] Appl. No.: 08/756,526

[22] Filed: Nov. 26, 1996

[51] Int. Cl.$^6$ ................................ G06K 9/00; G06K 9/62
[52] U.S. Cl. ........................... 382/124; 382/209; 382/228
[58] Field of Search ..................................... 382/226, 228, 382/227, 298, 296, 124, 125, 201, 205, 209; 340/146

[56] References Cited

U.S. PATENT DOCUMENTS

| | | |
|---|---|---|
| 4,135,147 | 1/1979 | Riganati et al. ..................... 340/146.3 |
| 4,618,989 | 10/1986 | Tsukune et al. ......................... 382/203 |
| 5,140,642 | 8/1992 | Hsu et al. ................................ 382/125 |
| 5,259,038 | 11/1993 | Sakou et al. ............................ 382/155 |
| 5,392,367 | 2/1995 | Hsu et al. ................................ 382/228 |
| 5,659,626 | 8/1997 | Ort et al. ................................. 382/125 |

*Primary Examiner*—Leo H. Boudreau
*Assistant Examiner*—Bhavesh Mehta
*Attorney, Agent, or Firm*—Bacon & Thomas

[57] ABSTRACT

A method for automatic matching of planar point patterns in a reference pattern with a test pattern includes course mating, calculation of a mated possibility for one point in each pattern, preliminary selection of mated pairs based on these possibilities, and calculation of a similarity value based upon the number of mated pairs, the mated rate of the reference and test patterns, and the average mating possibility and average distance between mated points.

18 Claims, 11 Drawing Sheets

| Pattern A | | |
|---|---|---|
| | X-coordinate | Y-coordinate | Feature Direction |
| 1 | 24 | 48 | 0 |
| 2 | 48 | 48 | 23 |
| 3 | 72 | 48 | 45 |
| 4 | 96 | 48 | 68 |
| 5 | 24 | 88 | 90 |
| 6 | 48 | 88 | 113 |
| 7 | 72 | 88 | 135 |
| 8 | 96 | 88 | 158 |
FIG. 5(a)
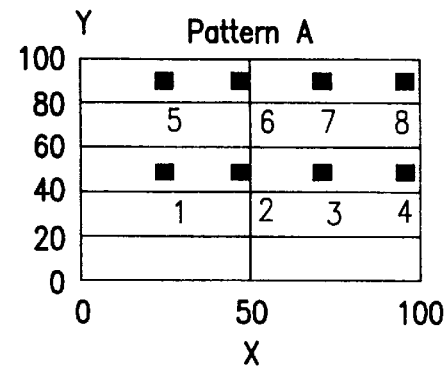
FIG. 5(b)
| Pattern B | | |
|---|---|---|
| | X-coordinate | Y-coordinate | Feature Direction |
| 1 | 33 | 36 | 20 |
| 2 | 55 | 45 | 43 |
| 3 | 76 | 53 | 65 |
| 4 | 100 | 64 | 88 |
| 5 | 21 | 74 | 110 |
| 6 | 41 | 79 | 133 |
| 7 | 64 | 90 | 155 |
| 8 | 86 | 99 | 178 |
FIG. 6(a)
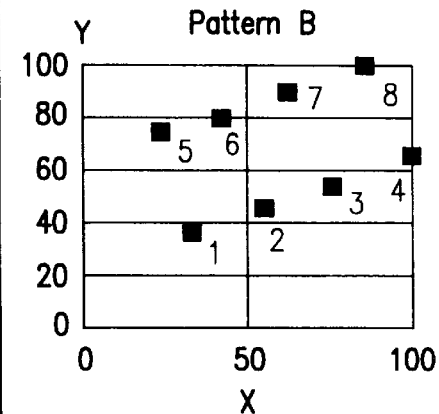
FIG. 6(b)
| Pattern C | | |
|---|---|---|
| | X-coordinate | Y-coordinate | Feature Direction |
| 1 | 16 | 40 | 0 |
| 2 | 16 | 80 | 20 |
| 3 | 48 | 40 | 40 |
| 4 | 48 | 80 | 60 |
| 5 | 88 | 40 | 90 |
| 6 | 88 | 80 | 110 |
| 7 | 120 | 40 | 140 |
| 8 | 120 | 80 | 160 |
FIG. 7(a)
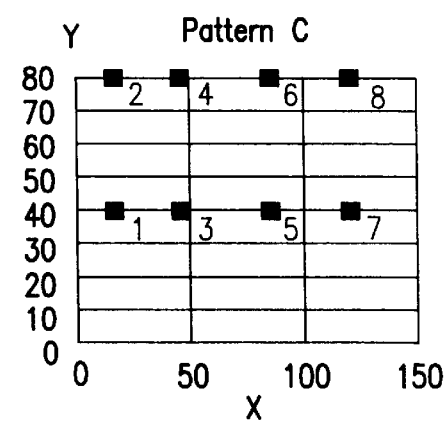
FIG. 7(b)

|    | a1 | a2 | a3 | a4 | a5 | a6 | a7 | a8 |
|----|----|----|----|----|----|----|----|----|
| b1 | 1  | 1  | 1  | 0  | 0  | 0  | 0  | 0  |
| b2 | 1  | 1  | 1  | 1  | 0  | 0  | 0  | 0  |
| b3 | 0  | 1  | 1  | 1  | 0  | 0  | 0  | 0  |
| b4 | 0  | 0  | 1  | 1  | 0  | 0  | 0  | 0  |
| b5 | 0  | 0  | 0  | 0  | 1  | 1  | 0  | 0  |
| b6 | 0  | 0  | 0  | 0  | 1  | 1  | 1  | 0  |
| b7 | 0  | 0  | 0  | 0  | 0  | 1  | 1  | 1  |
| b8 | 0  | 0  | 0  | 0  | 0  | 0  | 1  | 1  |

FIG. 8

|    | a1 | a2 | a3 | a4 | a5 | a6 | a7 | a8 |
|----|----|----|----|----|----|----|----|----|
| c1 | 1  | 1  | 0  | 0  | 0  | 0  | 0  | 0  |
| c2 | 1  | 1  | 0  | 0  | 0  | 0  | 0  | 0  |
| c3 | 1  | 1  | 1  | 1  | 0  | 0  | 0  | 0  |
| c4 | 0  | 1  | 1  | 1  | 1  | 0  | 0  | 0  |
| c5 | 0  | 0  | 1  | 1  | 0  | 1  | 1  | 0  |
| c6 | 0  | 0  | 0  | 1  | 0  | 1  | 1  | 0  |
| c7 | 0  | 0  | 0  | 0  | 0  | 0  | 1  | 1  |
| c8 | 0  | 0  | 0  | 0  | 0  | 0  | 1  | 1  |

FIG. 9

|    | a2 | a3 | a4 | a5 | a6 | a7 | a8 |
|----|----|----|----|----|----|----|----|
| b2 | 0.71(-22度) | 0 | 0 | 0 | 0 | 0 | 0 |
| b3 | 0 | 0.55 (-21度) | 0 | 0 | 0 | 0 | 0 |
| b4 | 0 | 0 | 1.0(-22度) | 0 | 0 | 0 | 0 |
| b5 | 0 | 0 | 0 | 0.71(-17度) | 0 | 0 | 0 |
| b6 | 0 | 0 | 0 | 0 | 0.45(-20度) | 0 | 0 |
| b7 | 0 | 0 | 0 | 0 | 0 | 1.0(-21度) | 0 |
| b8 | 0 | 0 | 0 | 0 | 0 | 0 | 1.0(-20度) |

FIG. 10

Mated Possibilities at Rotation Angle -20°

|     | a1   | a2   | a3   | a4   | a5   | a6   | a7   | a8   |
| --- | ---- | ---- | ---- | ---- | ---- | ---- | ---- | ---- |
| b1  | 5.42 | 3.42 | 0    | 0    | 0    | 0    | 0    | 0    |
| b2  | 3.64 | 4.19 | 2.19 | 0    | 0    | 0    | 0    | 0    |
| b3  | 0    | 2.26 | 2.64 | 0.93 | 0    | 0    | 0    | 0    |
| b4  | 0    | 0    | 1.55 | 2.00 | 0    | 0    | 0    | 0    |
| b5  | 0    | 0    | 0    | 0    | 1.54 | 0.83 | 0    | 0    |
| b6  | 0    | 0    | 0    | 0    | 1.42 | 1.87 | 0    | 0    |
| b7  | 0    | 0    | 0    | 0    | 0    | 0.71 | 1.27 | 0.71 |
| b8  | 0    | 0    | 0    | 0    | 0    | 0    | 0    | 0.26 |

FIG. 11

Mated Possibilities at Rotation Angle 0°

|     | a1 | a2 | a3 | a4   | a5 | a6   | a7 | a8 |
| --- | -- | -- | -- | ---- | -- | ---- | -- | -- |
| b1  | 0  | 0  | 0  | 0    | 0  | 0    | 0  | 0  |
| b2  | 0  | 0  | 0  | 0.20 | 0  | 0    | 0  | 0  |
| b3  | 0  | 0  | 0  | 0    | 0  | 0    | 0  | 0  |
| b4  | 0  | 0  | 0  | 0    | 0  | 0    | 0  | 0  |
| b5  | 0  | 0  | 0  | 0    | 0  | 0    | 0  | 0  |
| b6  | 0  | 0  | 0  | 0    | 0  | 0.20 | 0  | 0  |
| b7  | 0  | 0  | 0  | 0    | 0  | 0    | 0  | 0  |
| b8  | 0  | 0  | 0  | 0    | 0  | 0    | 0  | 0  |

FIG. 12

Mated Possibilities at Rotation Angle +20°

|     | a1 | a2 | a3   | a4   | a5 | a6   | a7   | a8   |
| --- | -- | -- | ---- | ---- | -- | ---- | ---- | ---- |
| b1  | 0  | 0  | 0.71 | 0    | 0  | 0    | 0    | 0    |
| b2  | 0  | 0  | 0.71 | 1.04 | 0  | 0    | 0    | 0    |
| b3  | 0  | 0  | 0    | 1.10 | 0  | 0    | 0    | 0    |
| b4  | 0  | 0  | 0    | 0    | 0  | 0    | 0    | 0    |
| b5  | 0  | 0  | 0    | 0    | 0  | 1.64 | 0    | 0    |
| b6  | 0  | 0  | 0    | 0    | 0  | 0    | 1.66 | 0    |
| b7  | 0  | 0  | 0    | 0    | 0  | 0    | 0    | 3.42 |
| b8  | 0  | 0  | 0    | 0    | 0  | 0    | 0    | 0    |

FIG. 13

Mated Possibilities at Rotation Angle -20°

|    | a1 | a2 | a3 | a4   | a5 | a6 | a7 | a8 |
|----|----|----|----|------|----|----|----|----|
| c1 | 0  | 0  | 0  | 0    | 0  | 0  | 0  | 0  |
| c2 | 0  | 0  | 0  | 0    | 0  | 0  | 0  | 0  |
| c3 | 0  | 0  | 0  | 0    | 0  | 0  | 0  | 0  |
| c4 | 0  | 0  | 0  | 0    | 0  | 0  | 0  | 0  |
| c5 | 0  | 0  | 0  | 0.20 | 0  | 0  | 0  | 0  |
| c6 | 0  | 0  | 0  | 0    | 0  | 0  | 0  | 0  |
| c7 | 0  | 0  | 0  | 0    | 0  | 0  | 0  | 0  |
| c8 | 0  | 0  | 0  | 0    | 0  | 0  | 0  | 0  |

FIG. 14

Mated Possibilities at Rotation Angle 0°

|    | a1   | a2   | a3   | a4   | a5 | a6   | a7   | a8   |
|----|------|------|------|------|----|------|------|------|
| c1 | 1.23 | 0.23 | 0    | 0    | 0  | 0    | 0    | 0    |
| c2 | 0    | 0.23 | 0    | 0    | 0  | 0    | 0    | 0    |
| c3 | 0    | 0.46 | 0.23 | 0    | 0  | 0    | 0    | 0    |
| c4 | 0    | 0    | 0.23 | 0    | 0  | 0    | 0    | 0    |
| c5 | 0    | 0    | 0    | 1.23 | 0  | 0.23 | 0    | 0    |
| c6 | 0    | 0    | 0    | 0    | 0  | 0.23 | 0.23 | 0    |
| c7 | 0    | 0    | 0    | 0    | 0  | 0    | 0.23 | 0    |
| c8 | 0    | 0    | 0    | 0    | 0  | 0    | 0.23 | 0.23 |

FIG. 15

Mated Possibilities at Rotation Angle +20°

|    | a1 | a2 | a3 | a4 | a5   | a6 | a7 | a8 |
|----|----|----|----|----|------|----|----|----|
| c1 | 0  | 0  | 0  | 0  | 0    | 0  | 0  | 0  |
| c2 | 0  | 0  | 0  | 0  | 0    | 0  | 0  | 0  |
| c3 | 0  | 0  | 0  | 0  | 0    | 0  | 0  | 0  |
| c4 | 0  | 0  | 0  | 0  | 0.20 | 0  | 0  | 0  |
| c5 | 0  | 0  | 0  | 0  | 0    | 0  | 0  | 0  |
| c6 | 0  | 0  | 0  | 0  | 0    | 0  | 0  | 0  |
| c7 | 0  | 0  | 0  | 0  | 0    | 0  | 0  | 0  |
| c8 | 0  | 0  | 0  | 0  | 0    | 0  | 0  | 0  |

FIG. 16

|    | a1   | a2   | a3   | a4   | a5   | a6   | a7   | a8   |                    |
|----|------|------|------|------|------|------|------|------|--------------------|
| b1 | 5.42 | 0    | 0    | 0    | 0    | 0    | 0    | 0    | b1 and a1 are mated. |
| b2 | 0    | 4.19 | 0    | 0    | 0    | 0    | 0    | 0    | b2 and a2 are mated. |
| b3 | 0    | 0    | 2.64 | 0    | 0    | 0    | 0    | 0    | b3 and a3 are mated. |
| b4 | 0    | 0    | 0    | 2.00 | 0    | 0    | 0    | 0    | b4 and a4 are mated. |
| b5 | 0    | 0    | 0    | 0    | 1.54 | 0    | 0    | 0    | b5 and a5 are mated. |
| b6 | 0    | 0    | 0    | 0    | 0    | 1.87 | 0    | 0    | b6 and a6 are mated. |
| b7 | 0    | 0    | 0    | 0    | 0    | 0    | 1.27 | 0    | b7 and a7 are mated. |
| b8 | 0    | 0    | 0    | 0    | 0    | 0    | 0    | 0.26 | b8 and a8 are mated. |

N=8, SMAX=5.42, $\beta = -20°$

FIG. 17

|    | a1   | a2   | a3   | a4   | a5   | a6   | a7   | a8   |                    |
|----|------|------|------|------|------|------|------|------|--------------------|
| c1 | 1.23 | 0    | 0    | 0    | 0    | 0    | 0    | 0    | c1 and a1 are mated |
| c2 | 0    | 0    | 0    | 0    | 0    | 0    | 0    | 0    |                    |
| c3 | 0    | 0.46 | 0    | 0    | 0    | 0    | 0    | 0    | c3 and a2 are mated |
| c4 | 0    | 0    | 0.23 | 0    | 0    | 0    | 0    | 0    | c4 and a3 are mated |
| c5 | 0    | 0    | 0    | 1.23 | 0    | 0    | 0    | 0    | c5 and a4 are mated |
| c6 | 0    | 0    | 0    | 0    | 0    | 0.23 | 0    | 0    | c6 and a6 are mated |
| c7 | 0    | 0    | 0    | 0    | 0    | 0    | 0.23 | 0    | c7 and a7 are mated |
| c8 | 0    | 0    | 0    | 0    | 0    | 0    | 0    | 0.23 | c8 and a8 are mated |

N=7, SMAX=1.23, $\beta = 0°$

| Pattern B | | Pattern B after transformation | | Mated points in Pattern A | | Distances between Mated Points |
|---|---|---|---|---|---|---|
| x-Coordinate | y-Coordinate | x-Coordinate | y-Coordinate | x-Coordinate | y-Coordinate | |
| 33 | 36 | 24.26 | 48.99 | 24 | 48 | 1.05 |
| 55 | 45 | 48.03 | 48.74 | 48 | 48 | 0.55 |
| 76 | 53 | 70.49 | 47.97 | 72 | 48 | 2.27 |
| 100 | 64 | 96.88 | 48.79 | 96 | 48 | 1.39 |
| 41 | 79 | 48.33 | 85.51 | 48 | 88 | 6.29 |
| 21 | 74 | 27.96 | 88.67 | 24 | 88 | 16.1 |
| 64 | 90 | 73.8 | 86.72 | 72 | 88 | 4.85 |
| 86 | 99 | 97.56 | 86.48 | 96 | 88 | 4.76 |

FIG. 20

| Pattern B | | Pattern B after transformation | | Mated points in Pattern A | | Distances between Mated Points |
|---|---|---|---|---|---|---|
| x-Coordinate | y-Coordinate | x-Coordinate | y-Coordinate | x-Coordinate | y-Coordinate | |
| 33 | 36 | 23.88 | 48.26 | 24 | 48 | 0.08 |
| 55 | 45 | 47.65 | 48.66 | 48 | 48 | 0.56 |
| 76 | 53 | 70.11 | 48.5 | 72 | 48 | 3.79 |
| 100 | 64 | 96.47 | 50.04 | 96 | 48 | 4.41 |
| 41 | 79 | 46.93 | 85.42 | 48 | 88 | 7.76 |
| 21 | 74 | 26.48 | 88.02 | 24 | 88 | 6.14 |
| 64 | 90 | 72.35 | 87.33 | 72 | 88 | 0.56 |
| 86 | 99 | 96.12 | 87.74 | 96 | 88 | 0.08 |

FIG. 21

| Pattern C | | Pattern C after transformation | | Mated Points in Pattern A | | Distances between Mated Points |
|---|---|---|---|---|---|---|
| x-Coordinate | y-Coordinate | x-Coordinate | y-Coordinate | x-Coordinate | y-Coordinate | |
| 16 | 40 | 21.33 | 48 | 24 | 48 | 7.11 |
| 88 | 40 | 93.33 | 48 | 96 | 48 | 7.11 |
| 48 | 40 | 53.33 | 48 | 48 | 48 | 28.44 |
| 48 | 80 | 53.33 | 88 | 72 | 48 | 1948.4 |
| 88 | 80 | 93.33 | 88 | 48 | 88 | 2055.1 |
| 120 | 40 | 125.33 | 48 | 72 | 88 | 4444.4 |
| 120 | 80 | 125.33 | 88 | 96 | 88 | 860.4 |

FIG. 22

| Pattern C | | Pattern C after transformation | | Mated Points in Pattern A | | Distances between Mated Points |
|---|---|---|---|---|---|---|
| x-Coordinate | y-Coordinate | x-Coordinate | y-Coordinate | x-Coordinate | y-Coordinate | |
| 16 | 40 | 21.33 | 48 | 24 | 48 | 7.11 |
| 88 | 40 | 93.33 | 48 | 96 | 48 | 7.11 |
| 48 | 40 | 53.33 | 48 | 48 | 48 | 28.44 |

# METHOD AND DEVICE FOR AUTOMATIC MATCHING OF PLANAR POINT PATTERNS

FIELD OF INVENTION

The present invention relates to a method and a device for automatic matching of planar point patterns, especially to the automatic matching for image patterns consisting of points which are distributed in a coordinate plan.

BACKGROUND OF INVENTION

The matching of two or more planar point patterns in a computer system is an important technique in the field of computer vision and in the image processing technology. When an image is input into a computer in a digitized format, the "feature points" of the image can be abstracted with the conventional feature abstracting technologies, according to the characters of the image or to the purposes of the processing. The feature points, more concretely, the coordinates and other characters of the points, so obtained can be used in the recognition of the image. For example, by matching the distribution of the feature points of two images patterns, the similarity of the patterns comprising the feature points can be decided. Thus, the similarity of the images can be determined.

A good example of the application of the pattern matching technology is the matching of fingerprints. When the image of a fingerprint is scanned by an image scanner, the image is digitized and input to a computer. The computer uses a software or a circuit to abstract the distribution of the feature points of the fingerprint, usually the end points and the cross points of the lines and curves of the fingerprint. By matching two patterns comprising feature points obtained (scanned) in different time or places, whether the two fingerprints came from the same finger, can be determined.

Another application for the matching technology is the recognition of hand-written characters. Such technology is also called "optical character recognition—OCR" and is especially applicable to the recognition of Chinese characters or Japanese "kanji".

In the matching of two planar point patterns so obtained, several problems will be faced. First, the number of feature points of two patterns could be different, even if they were abstracted from a same image or the same image source. Another problem is, the possibility that each feature point exists at the same position in both patterns can not be forecast. Thirdly, while the images (patterns) were obtained at different time and/or places, the distribution of the feature points in one pattern could be shifted, rotated and/or distorted (enlarged or reduced), in relating to the other pattern.

Taiwan patent application No.79109743 (corresponding to U.S. Pat. No. 5,392,367) related to a "Method and Device for the Automated Matching and Recognition for Planar Pattern Points" wherein a "fuzzy relaxation" approach was introduced.

According to said Taiwan patent, the matching of two planar point patterns are conducted in two steps. The first step is to mate the points of one pattern (the reference pattern) with the points of another pattern (the test pattern). The second step is to calculate the similarity of the two patterns, according to the result of the mating. Here, mating means, for every point (feature point) in the test pattern, locating one only point in the reference pattern, such that the two mated points are overlapped or with very short distance, if they were in the same coordinate system. The reason for the mating includes that, when two patterns are similar, most points of one pattern will be mated with the points of the other.

In the mating process, a "course matching" is used to exclude pairs of points that are impossible to be mated. The initial "mated possibility" of one point from the reference pattern to be mated with one point from the test pattern is set at 0 for those pairs that can not be mated and is set at 1 for other pairs. The mated possibility of a pair is then adjusted by the "fuzzy relaxation" method. In this Taiwan patent, the mated possibility of a pair is adjusted according to "the value of other mated pairs to support such mating, given that such one pair is mated". The mated possibility of one mated pair is adjusted by the following equation:

$$S^{(r)}(pi, qj) = \frac{\sum_{h \neq i, k \neq j} \{\max[S^{(r-1)}(pi, qj) \times Cij(h, k)]\}}{m - 1};$$

wherein $S^{(r)}(pi,qj)$ represents the mated possibility of points pi and qj, when it is adjusted for the $r^{th}$ time; pi represents a point from the test pattern P wherein i=1, 2, ..., m; qj represents a point from the reference pattern Q wherein j=1, 2, ..., m; Cij(h, k) represents the possibility that another pair ph and qk are mated (ph is a point of Pattern P, h=1, 2, ..., m, h≠i, qk is a point of Pattern Q, k=1, 2, ..., m, k≠j) and $$Cij(h, k) = \frac{1}{l + \Delta}, \Delta = \frac{|l_{ih} - l_{jk}|}{|l_{ih} + l_{jk}|},$$

l's represent distances between pi and ph or between qj and qk and m represents the least number of points in patterns P and Q.

While the mated possibility of every point from the reference pattern with every point from the test pattern is calculated under the "fuzzy relaxation" method, the best mated pairs, i.e., the pairs with the highest mated possibilities, can be selected under a "sequential forward selection method".

In the second step, the similarity of the reference pattern and the test pattern can be calculated employing the following components. They are: the mated rate (number of mated pairs/least number of points of the two patterns), the average mated possibility, the average distance of mated pairs and the scaling factor.

In order to solve the problem of distortion, including shift, rotation and proportional scaling, a "least mean-square-error" value was introduced to adjust the distribution of the test pattern.

Although the above-said patent taught an automatic matching method for planar point patterns with high efficiency, it inherits the problem of relatively high rejection rate. If the "false acceptance rate—FAR" is set at 0.1%, in matching 800 fingerprint images, its "false rejection rate—FRR" will be about 25%. This means, when two images are from the same fingerprint, the possibility that the system decides they are not from the same fingerprint is 25%.

Nevertheless, the processing under this conventional art takes relatively long time. Matching of two planar point patterns takes approximately 0.45 second in average.

It is then necessary to develop an automatic matching device and method for planar point patterns wherein the FRR can be reduced. It is also necessary to have an automatic matching device and method that match planar point patterns with higher speed.

PURPOSES OF THE INVENTION

The purpose of this invention is to provide a method that can automatically match patterns of points which distribute in a plan in which the number of points can be different, the distribution of the points can not be forecast and the patterns can be distorted.

Another purpose of this invention is to provide an automatic matching method for planar point patterns with lower false rejection rate (FRR).

Another purpose of this invention is to provide a method to automatically match at least two planar point patterns with higher speed.

Another purpose of this invention is to provide an automatic matching device for planar point patterns that has the above-said advantages.

SUMMARY OF THE INVENTION

According to this invention, a method and device for the automatic matching of planar point patterns is disclosed. The matching process of this invention comprises:

1. Coarse mating: Basic requirements for one point from the reference pattern to be mated with one point from the test pattern are introduced. If the relation of one point from one pattern and one point from the other pattern does not satisfy anyone of the requirements, they are considered not a mated pair.

2. Calculation of mated possibility: In the calculation of mated possibility for one point from the test pattern and one point from the reference pattern, The cumulative mated possibilities of the points besides the to be mated is considered. The mated possibility of a point pi from the test reference P and a point qj from the reference pattern Q is calculated according to the following equation:

$$S[i][j][\theta] = \sum_{h=1, h \neq i}^{m} \left\{ \max_{k=1, k \neq j}^{m} \{C_{ijhk}[\theta]\} \right\},$$

if $C_{ijhk} \neq 0$; Otherwise, $S[i][j][\theta]=0$.

In the equation the matrix $S[i][j][\theta]$ represents the mated possibilities of pi and qj (i, j=1, 2, ..., m), $C_{ijhk}[\theta]$ represents the mated possibility of another point ph from pattern P (h=1, 2, ..., m, h≠i) to be mated with another point qk from pattern Q (k=1, 2, ..., m, k≠j) at a rotation angle θ under the premise that pi and qj are mated.

3. Preliminary selection of mated pairs and transformation of patterns: Pairs with highest mated possibilities are selected, based on which a transformation is obtained and is used to transform (shifting and rotation) the test pattern.

4. Calculation of similarity: The similarity of the patterns are calculated based on the following factors: number of mated pairs, mated rate of the reference pattern, mated rate of the test pattern, average mated possibility and average distance between mated points.

5. Determination: A threshold is decided to determine whether the patterns are similar.

The above and other purposes and advantages of the invention can be fully understood from the detailed description by referring to the following drawings.

BRIEF DESCRIPTION OF THE DRAWINGS

FIGS. 5–7 illustrate three patterns (Pattern A FIG. 5(b)), Pattern B FIG. 6(b) and Pattern C FIG. 7(b)) consisting of 8 planar points, indicating the coordinates and feature points of the points.

FIG. 8 illustrates the results of the coarse mating of Patterns B and A.

FIG. 9 illustrates the results of coarse mating of Patterns C and A.

FIG. 10 illustrates the supporting values of points of Pattern B and points of Pattern A to the mating of b1 of Pattern B and a1 of Pattern B.

FIGS. 11–13 illustrate the mated possibilities between points of Pattern B and points of Pattern A.

FIGS. 14–16 illustrate the mated possibilities between points of Pattern C and points of Pattern A.

FIG. 17 illustrates the results of preliminary selection of mated points from Patterns B and A.

FIG. 18 illustrates the results of preliminary selection of mated points from Patterns C and A.

FIG. 19 illustrates the coordinates of points of Pattern B and the distance between the mated points after transformation.

FIG. 20 illustrates the coordinates of points of Pattern B and the distance between the mated points after the second transformation.

FIG. 21 illustrates the coordinations of points of Pattern C and the distance between the mated points after transformation.

FIG. 22 illustrates the coordinates of of points of Pattern C and the distance between the mated points after the second transformation.

DETAILED DESCRIPTION OF THE INVENTION

The following is a detailed description of the embodiment of the present invention.

Given two patterns consisting of points distributed in a coordinate plan (hereinafter referred to as "planar point patterns") P and Q where:

P={p1, p2, p3, ..., pm} is the test pattern consisting of m points and

Q={q1, q2, q3, ..., qn} is the reference pattern consisting of n points;

wherein the points are expressed as (x, y, D) in which (x, y) represents the coordinate of the point and D represent its feature direction.

In the application of this invention, the patterns always represent feature points abstracted from digitized images. For example, the image can be a fingerprint and the feature points represent the terminal points and the cross points of the lines and curves of the fingerprint. The image can also be a hand-written character. In this case the feature points are the end points and the cross points of the lines and curves of the characters. In other application, the feature points can represent other features of images. Usually the feature points are connected or related to a certain lines or curves. Thus, for the purposes of this invention, the "feature direction" of a point is thus defined as:

1. When a point is the terminal point of a line or curve, the feature direction D represents the tangent direction of the line; and 2. When a point is the cross point of two or more lines or curves, the feature direction D represents the bisector direction of the acute angle formed by the lines.

The unit of the feature direction is angle where 0 angle is the positive horizontal direction and positive direction is the clockwise direction.

Figure 1:
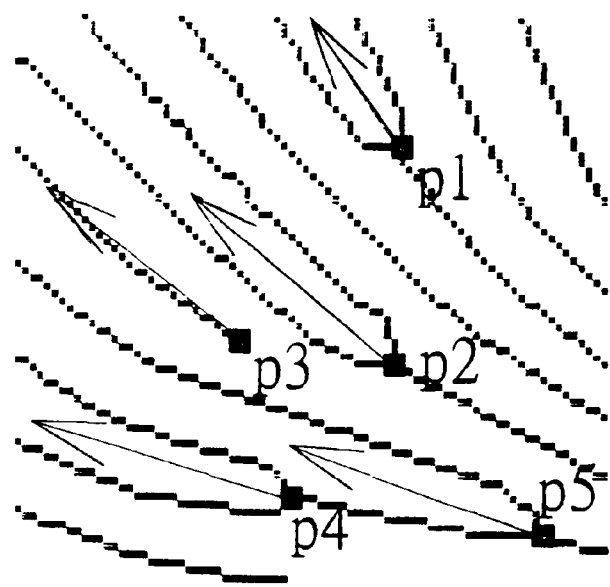
FIG. 1 illustrates a image of a fingerprint.
Figure 2:
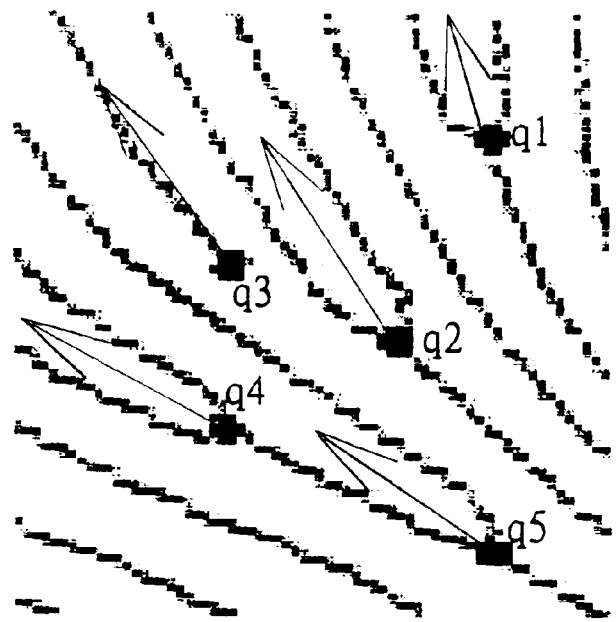
FIG. 2 illustrates another image of the fingerprint of FIG. 1.

FIG. 1 shows a digitized image of a fingerprint, with feature points as abstracted. FIG. 2 shows another digitized image of the fingerprint of FIG. 1, with feature points as abstracted. As can be seen, FIG. 1 is a pattern similar to the pattern of FIG. 2, if it is shifted and rotated for an angle. In the figures, the arrow shows the feature directions of the feature points.

In matching pattern P and pattern Q as defined above, pattern P shall be rotated aeangle and shifted along X axis and Y axis at distances (tx, ty) so that most points in pattern P can be mated (overlapped or with a very short distance) with the points in pattern Q. We can thus use the function (tx, ty, θ) to describe the matching relation of the patterns. In other words, when the matching is ideal, a function (tx, ty, θ) can be found where pattern P is rotated a θ angle and shifted at distance (tx, ty) so that a maximum number of points in pattern P can be mated with points in pattern Q. Here the term "mated" means the one-to-one relation between a point pi of the test pattern P with its corresponding point qj of the reference pattern Q such that pi and qj are overlapped or with a very short distance.

Under such definition, suppose point pi of the test pattern P is mated with point qj of the reference pattern Q, such mating shall satisfy the following equations:

$$x_{qj} = tx + x_{pi} \cos\theta - y_{pi} \sin\theta \qquad (1)$$

$$y_{qj} = ty + x_{pi} \sin\theta + y_{pi} \cos\theta \qquad (2)$$

$$Dqj = (Dpi + Dr) + \theta \qquad (3)$$

wherein xpi and ypi represent the coordinate of point pi, xqj and yqj represent the coordinate of point qj, Dpi and Dqj represent the feature directions of pi and qj respectively, tx and ty represent the shift distance between the patterns along X axis and Y axis, Dr represents a distortion difference, i=1, 2, . . . m, j=1, 2, . . . , m, m is the least number of n and m.

Here, the distortion difference is defined as: the difference between the feature directions of the points of a mated pair after the test pattern is rotated a θ angle. In ideal cases, while the test pattern is rotated a θ angle, the feature direction of the points of a mated pair should be same. This, however, does not always happen, since a certain amount of distortion could exist during the abstraction of the feature points. Dr is introduced to represent the distortion and is expressed by degrees.

Figure 3:
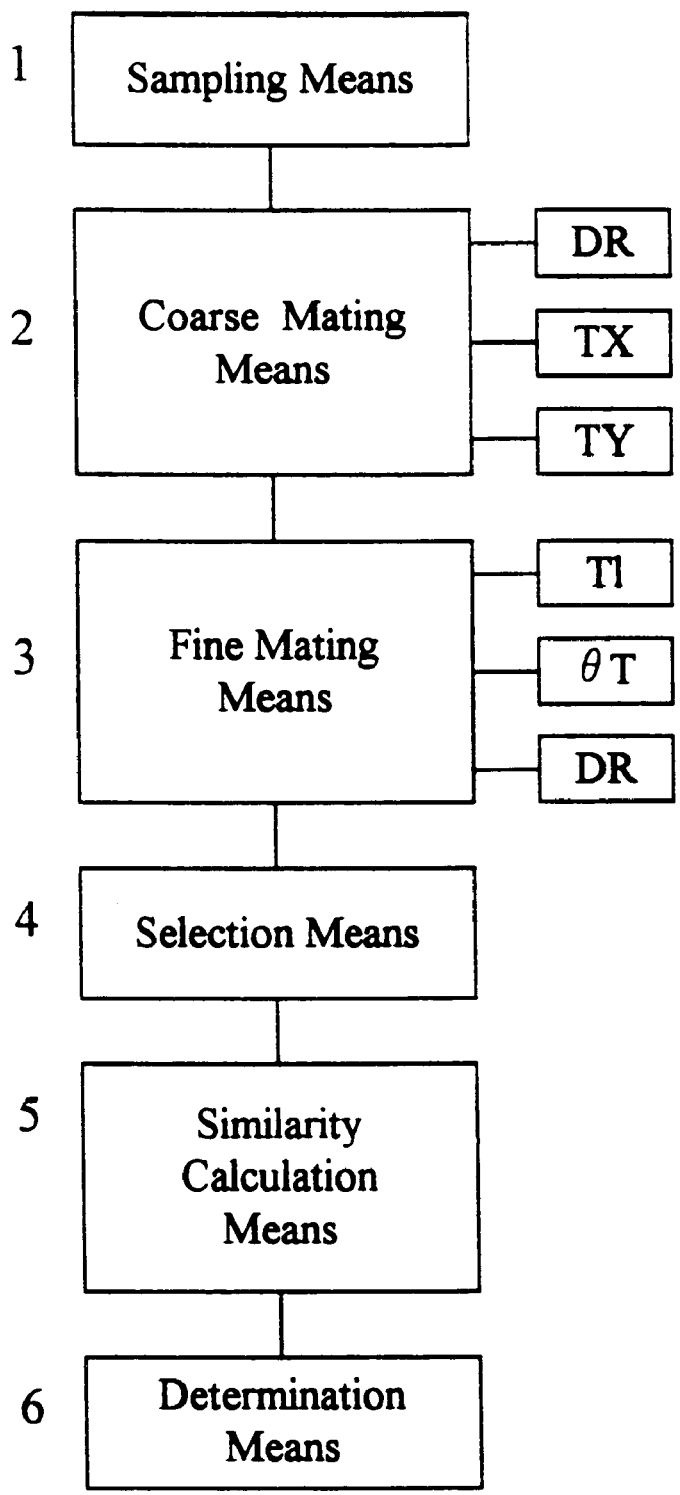
FIG. 3 illustrates the system schematics of the device for automatic matching of planar point patterns of this invention.

FIG. 3 illustrates the system schematics of the device for automatic matching of planar point patterns of this invention. As shown in the figure, the automatic matching device for planar point patterns of this invention comprises: a sampling means 1, a coarse mating means 2, a fine mating device 3, a selection means 4, a similarity calculation means 5 and a determination means 6.

Figure 4:
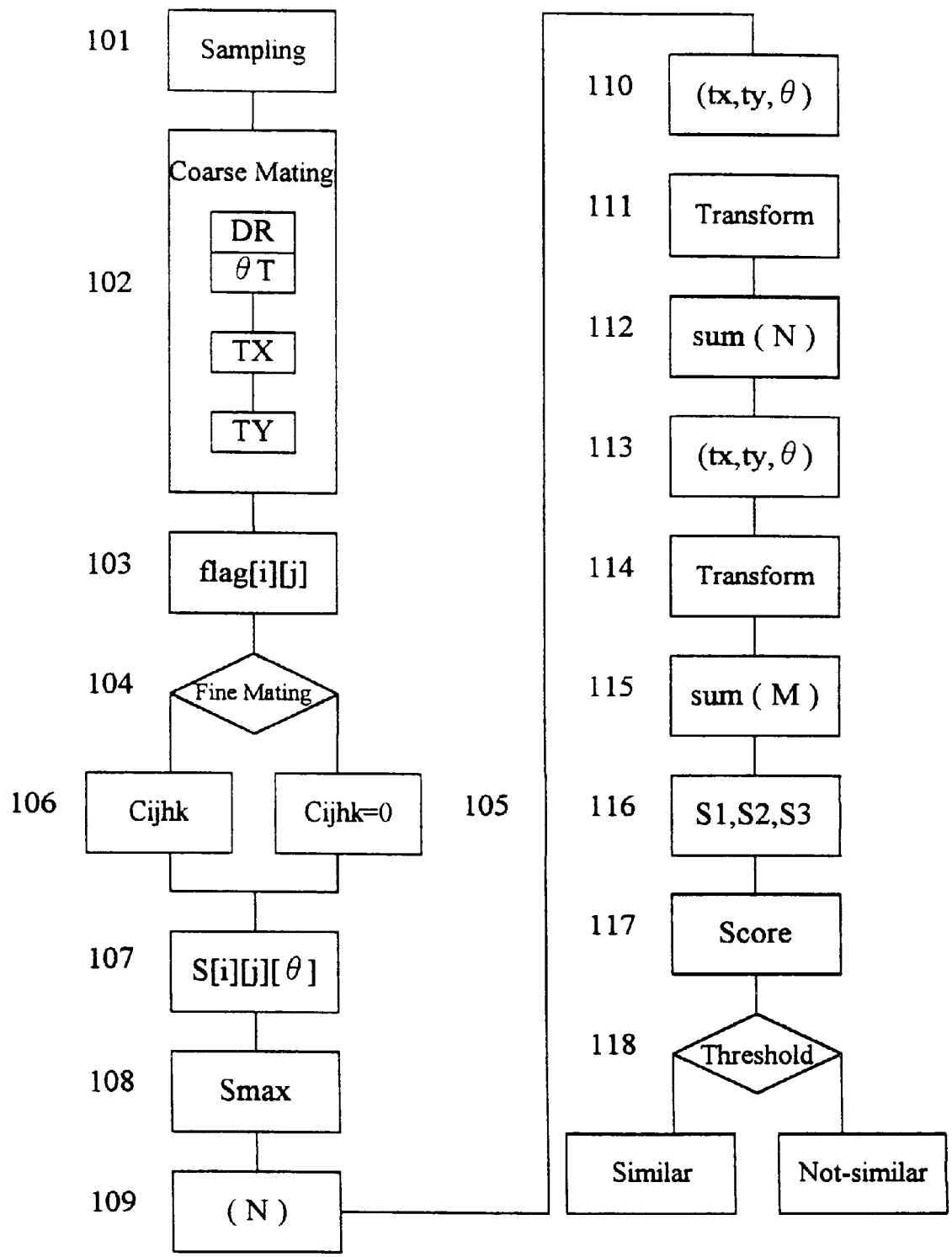
FIG. 4 illustrates the flow chart of the method for automatic matching of planar point patterns of this invention.

FIG. 4 illustrates the flow chart of the automatic matching method for planar point patterns of this invention. The following is a description of this invention by reference to the figures.

COARSE MATING

At 101, the sampling means 1 obtains two planar point patterns P and Q. The data so obtained include the coordinates and the feature points of the points of the patterns. At 102 the coarse mating means 2 decides the initial mated possibilities of every point from pattern P and every point from pattern Q with coarse mating.

The purpose of coarse mating is to exclude pairs of points that can not be mated according to their geometric relations. In the coarse mating several criteria are suggested to decide whether a point (pi, i=1, 2, ., , , m) from pattern P and a point (qj, j=1, 2, . . . , n) from pattern Q are definitely not mated. When the geometric relation of pi and qj does not satisfy any of the criteria, at 103 the coarse mating means 2 set their initial mated possibility flag[i][j] to 0; Otherwise, their flag[i][j] is set to 1.

From equations (1), (2) and (3) we know, when a point pi from the test pattern P is mated with a point qj from the reference pattern Q, the following conditions shall be satisfied:

(a) Feature direction:
From equation (3) we have:
Dqj−Dpi=Dr+θ and
|Dqj−Dpi|<=|Dr|+|θ|.
Set a maximum tolerance for the difference of the feature direction DR and a maximum tolerance for the rotation angle θT, we then have:

$$|Dqj - Dpi| <= DR + \theta T \qquad (4)$$

In the coarse mating, if the difference of Dqj and Dpi is greater than (DR+θT), it can be decided that pi and qj are not mated.

(b) Shifting in the X direction:
From equation (1) we have:
$x_{qj} - x_{pi} = tx + x_{pi}(\cos\theta - 1) - y_{pi} \sin\theta$
$|x_{qj} - x_{pi}| \leq |tx| + |x_{pi}(\cos\theta - 1) - y_{pi} \sin\theta|$.
If TX is the maximum tolerance of shifting in the X direction, we have:

$$|x_{qj} - x_{pi}| \leq TX \qquad (5)$$

If the difference of $x_{qj}$ and $x_{pi}$ is greater than TX, it can be decided that pi and qj can not be mated.

(c) Shifting in the Y direction:
From equation (2) we have:
$y_{qj} - y_{pi} = ty + x_{pi} \sin\theta + y_{pi}(\cos\theta - 1)$
$|y_{qj} - y_{pi}| \leq |ty| + |x_{pi} \sin\theta + y_{pi}(\cos\theta - 1)|$
If TY is the maximum tolerance for shifting in the Y direction, we have:

$$|y_{qj} - y_{pi}| \leq TY \qquad (6)$$

When the difference of $y_{qj}$ and $y_{pi}$ is greater than TY, it can be decided that pi and qj can not be mated.

When all the conditions of equations (4), (5) and (6) are satisfied, flag[i][j]=1; Otherwise, flag[i][j]=0. This process can be called "coarse mating".

FINE MATING

In this invention, only when flag [i][j]=1, the mated possibility of pi and qj will be calculated. In calculating the mated possibility of pi and qj, pi and qj are supposed to be mated and then the mated possibilities of points ph (h≠i) and points qk (k≠j) are calculated, if flag[h][k]=1. The results are used to calculate the mated possibility of pi and qj.

Although it is not intended to limit the scope of this invention with any theory, this approach is based on the fact that, if two patterns are similar, when a pair of points is mated, other pairs of points shall be mated. When the mating of pi qj makes the mating of ph and qk to be not ideal, pi and qj must not be an ideally mated pair. Here, the mated possibility of ph and qk means "the mated possibility of ph and qk under the premise that pi and qj are mated" and will be called "the supporting value of ph and qk to the mating of pi and qj" or "the supporting value of ph and qk" so that it can be distinguished with the "mated possibility" of pi and qj. The supporting value of ph and qk to the mating of pi and qj at the rotation angle θ can be expressed by Cijhk[θ].

In order to simplify the calculation of the mated possibility, a fine mating is introduced. At 104 the fine mating means 4 uses several criteria to decide whether the supporting value of ph (h≠i) and qk (k≠j) shall be used as a reference in the calculation of the mated possibility of pi and qj. When the geometric relation of ph and qk does not satisfy any of the criteria, the supporting value of ph and qk, Cijhk will be set to 0 at 105; Otherwise, the supporting value of ph and qk will be calculated at 106.

While pi and qj are mated and ph and qk are mated, the following conditions shall be satisfied:

(a) Distance condition:

In theory, when pi and qj are maed and ph and qk are mated, the distance between pi and ph and the distance between qj and qk shall be the same, if they are in the same coordinate plan. If dl represents the difference between the distance values, when the two pairs are both mated, d1 will be very small; Otherwise, d1 will be great. Thus, $$i\ d_1 = |\overline{q_j q_k} - \overline{p_i P_h}| \leq T_1 \quad (7)$$

In the equation T1 represents the maximum tolerance for the difference of the distance values, when the two pairs are mated. A T1 value is decided. If d1<=T1, Cijhk=0.

(b) Rotation condition:

In theory, when pi and qj and ph and qk are mated, the rotation angle of the test pattern θ shall be the difference between the direction of $\overline{qjqk}$ and $\overline{piph}$. Thus, $\theta = \theta_{\overline{qjqk}} - \theta_{\overline{piph}}$.

A θT representing the maximum tolerance of the rotaion angle, is decided. If both pairs are mated, $$|\theta| \leq \theta T \quad (8)$$

If |θ|>θT, Cijhk=0.

(c) Feature direction of the beginning points:
According to the above-said, we further have:
Dqj=Dpi+Dr+θ=Dpi+Dr+($\theta_{\overline{qjqk}} - \theta_{\overline{piph}}$). Thus,
(Dqi-$\theta_{\overline{qjqk}}$)-(Dpi-$\theta_{\overline{piph}}$)=Dr.
If Ds=|(Dqj-$\theta_{\overline{qjqk}}$)-(Dpi-$\theta_{\overline{piph}}$)|, a maximum tolerance of the rotation angle DR is decided. When the two pairs are mated, $$Ds<=DR. \quad (9)$$

If Ds>DR, Cijhk=0.

(d) Feature direction of the end points:
According to the above-said, we have:
Dqk=Dph+Dr+θ=Dph+Dr+$\theta_{\overline{qjqk}} - \theta_{\overline{piph}}$. Thus,
(Dqk-$\theta_{\overline{qjqk}}$)-(Dph-$\theta_{\overline{piph}}$)=Dr.
If De=|(Dqk-$\theta_{\overline{qjqk}}$)-(Dph-$\theta_{\overline{piph}}$)|, a maximum tolerance of the rotation angle DR is decided. When the two pairs are mated, $$De<=DR. \quad (10)$$

In case De>DR, Cijhk=0.

CALCULATION OF MATED POSSIBILITY

If the above conditions (7),(8),(9) and (10) are satisfied, pi and qj and ph and qk are possible mated pairs under the rotation of angle θ. The supporting value of each pair of ph and qj under the rotation anglee can be calculated at 106, as follow:

$$Cijhk[\theta] = \frac{1.0}{1.0 + w*d_1 + w_1*Ds + w_2*De} \quad (11)$$

wherein w, w1 and w2 are constants.

At 107 the fine mating means 3 calculates the sum of the supporting values of all ph (h=1, 2, ..., m, h≠i) and qk (k=1, 2, ..., n, k≠j) under several possible rotation angles. In calculating the mating possibility of pi and qj, for every ph (h≠i), only one qk (k≠j), where the supporting value of Cijhk is the maximum, is selected. For every group of pi, qj, ph and qk a rotation angle 0 can be calculated where $\theta = \theta_{\overline{qjqk}} - \theta_{\overline{piph}}$. While the supporting values of every pair of ph and qk under several rotation angles are obtained, the sum of the supporting values is added under such rotation angle and the result is considered the mated possibility of pi and qj. We thus have a matrix consisting of the mated possibilities of all pi and all qj, as follows:

$$S[i][j][\theta] = \sum_{h=0, h \neq i}^{m} \left\{ \max_{k=0, k \neq j}^{n} \{C_{ijhk}[\theta]\} \right\}, \quad (12)$$

if $Cijhk \neq 0$; Otherwise, $S[i][j][\theta] = 0$.

In practice, constants w1 and w2 may be 0, if only the distance condition is considered important.

PRELIMINARY SELECTION OF MATED PAIRS

After the mated possibility of every pi and qj is obtained, the best mated pairs of points between patterns P and Q are selected according to the values of the mated possibilities by the selection means 4. Here the value of the mated possibilities is used as the criteria of selecting mated pairs.

In order to determine an ideal s[i][j][θ], at 108, a SMAX matrix is found where a rotation angle β is found such that:

$$smax = S[i][j][\beta] = \max_{i,j,\theta}\{S[i][j][\theta]\} \quad (13)$$

If m is the number of points in pattern P, n is the number of points in pattern Q, the number of mated pairs k shall not be greater than m or n so that k≦min(m,n).

While the value of β is decided, at 109 the selection means 4 selects N mated pairs with the highest mated possibilities from the matrix S[i][j][β] in the sequence from large to small, as follow:

1. k=1.
2. A pair pa and qb with the greatest mated possibility (smax) is selected from S[i][j][β] and is considered a mated pair. Take pa as op[k], qb as oq[k] and smax as sim[k].
3. In matrix S[i][j][β], all elements in raw a and column b are labeled as 0.
4. k=k+1.

5. Repeat steps 2, 3 and 4 until smax=0.
6. N pairs (N=k−1) are selected preliminarily.

SECOND SELECTION OF MATED PAIRS

The N pairs as selected from the previous step may include some pairs that are not ideal in the matching of planar point patterns. However, in theory, those with higher mated possibilities shall be mated pairs. The result of the preliminary selection may be used as reference for a correct selection. At 110, the selection means 4 uses G pairs of mated points to find a best geometric transformation (tx, ty, θ) whereby, after the "p" points of the G pairs are transformed, the sum of the square distance between "p" and "q" points of the G pairs will be the least. In other words, a geometric transformation (tx, ty, θ) is found whereby E(tx, ty, θ) has the minimum value wherein:

$$E(tx, ty, \theta) = \sum_{i=1}^{G} (x_{oq[i]} - x'_{op[i]})^2 + (y_{oq[i]} - y'_{op[i]})^2$$

$$x'_{op[i]} = tx + x_{op[i]}\cos\theta - y_{op[i]}\sin\theta$$

$$y'_{op[i]} = ty + x_{op[i]}\sin\theta + y_{op[i]}\cos\theta$$

wherein ty and ty represent shifting in the X and Y directions, θ represents the angle of rotation, $x_{op}[i]$ and $y_{op}[i]$ represent the coordination of point p and $x'_{op}[i]$ and $y'_{op}[i]$ represent the coordination of point p, as transformed.

The value of G is the integral value of SMAX. If SMAX is smaller than 2, G=2.

At 111 the selection means 4 transforms the N points of pattern P with the geometric transformation with (tx, ty, θ). At 112, the sum of the square distance between p points and q points of the N pairs are calculated and compared with a threshold $d_1$. If the sum is smaller than a threshold $d_1$, the pair is considered mated; Otherwise, it is considered not mated and is deleted (mated possibility=0).

Suppose, after the selection, M pairs are reserved, a geometric transformation (tx, ty, θ) is found at 113 again. That is, to find a geometric transformation (tx, ty, θ) whereby a minimum value of E(tx, ty, θ) is obtained wherein:

$$E(tx, ty, \theta) = \sum_{i=1}^{M} (x_{oq[i]} - x'_{op[i]})^2 + (y_{oq[i]} - y'_{op[i]})^2$$

$$x'_{op[i]} = tx + x_{op[i]}\cos\theta - y_{op[i]}\sin\theta$$

$$y'_{op[i]} = ty + x_{op[i]}\sin\theta + y_{op[i]}\cos\theta$$

At 114, the p points of the M pairs are transformed with (tx, ty, θ). At 115, the sum of the distance between p points and q points of the M pairs are calculated compared with a thershold $d_2$. If the sum is smaller than a threshold $d_2$, the pair is considered mated; Otherwise, it is considered not mated and is deleted.

After two times of selection, K pairs are reserved. The average distance of the mated points of the K pairs is labeled as diff and the average mated possibility of patterns P and Q is labeled as md.

CALCULATION OF SIMILARITY OF TWO PATTERNS

From the previous process, the number of points of the patterns (n and m), the mated possibility of each mated pair and the coordinates of the mated points can be obtained. At 116, based on the above information, the similarity calculation means 5 calculates the following factors: number of mated pairs K, mated rate of the reference pattern S1, mated rate of the test pattern S2, average mated possibility md and average distance of mated points S3. With these factors, the similarity calculation means 5 calculates the index of similarity of the two patterns at 117. The index of similarity can be expressed as Score wherein higher Score means two patterns are similar and lower Score means not similar.

The definitions of the five factors are as follows:
(1) Number of mated pairs, K: The result of the fine selection.
(2) Mated rate of the reference pattern, S1: S1=K/n.
(3) Mated rate of the test pattern, S2: S2=K/m.
(4) Average mated rate, md:

$$md = \frac{1}{K}\sum_{i=1}^{K} sim[i] \quad (14)$$

(5) Average distance of mated points, S3:
S3=1.0/(1.0+diff)
The 1.0 in the denominator is added to prevent the denominator to be 0.

The above five factors are all in direct ratio with Score. The Score is thus defined as follows:

$$\text{Score} = C^*K^*S1^*S2^*S3^*md \quad (15)$$

wherein C is a constant.

DETERMINATION

At 118 the determination means 6 compares the Score with a threshold. If Score is greater than the threshold, the patterns are considered similar; Otherwise, they are considered not similar.

EMBODIMENTS

The followings serve to be descriptions to an embodiment of the automatic matching device and method for planar point patterns, of this invention.

FIGS. 5–7 illustrate three patterns (Pattern A, Pattern B and Pattern C) consisting of 8 planar points. The coordinates and feature directions of the points are listed in the tables. Among the patterns, Pattern B (FIG. 6(*b*) is similar to Pattern A (FIG. 5(*b*)), after shifting and rotation, and Pattern C (FIG. 7(*b*) and Pattern A are not similar. Here, Pattern represents the reference pattern and Patterns B and C are test patterns to be matched.

COARSE MATING

In this embodiment, TX is set at 50, TY at 50 and (DR+θT) at 60 degrees.

A. Mating of Pattern B and Pattern A:

Mating of points a1 and b1 is taken as an example of the mating of mated pairs in Patterns B and A. From FIGS. 5(*a*) and 6(*a*) we have: a1=(24, 48, 0) and b1=(33, 36, 20).

(a) Feature direction:
|Da1−Db1|=|0−20|=20<=60. The condition is satisfied.

(b) Shifting in the X direction:
$|x_{a1} - x_{b1}| = |24-33| = 9 \leq 50$. The condition is satisfied.

(c) Shifting in the Y direction:

$|y_{a1}-y_{b1}|=|48-36|=12\leq 50$. The condition is satisfied.

Since the three conditions are satisfied, let flag[b1][a1]=1.

Mating of points a1 and b3 is taken as an example of the mating of non-mated pairs in Patterns B and A. From FIGS. 5(a) and 6(a) we have: a1=(24, 48, 0) and b3=(76,53,65).

(a) Feature direction:

|Da1-Db3|=|0-65|=65≧60. The condition is not satisfied.

(b) Shifting in X direction:

$|x_{a1}-x_{b3}|24-76|=52>50$. The condition is not satisfied.

(c) Shifting in Y direction:

$|y_{a1}-y_{b3}|=|48-53|=5\leq 50$. The condition is satisfied.

Since at least one condition is not satisfied, let flag[b1][a1]=0.

The mating of other points are similar to the above and the description is thus omitted. The results of coarse mating of Patterns B and A are illustrated in FIG. 8.

B. Mating of Pattern C and Pattern A:

Same processes are adopted in the coarse mating of Patterns C and A. FIG. 9 illustrates the results of coarse mating of Patterns C and A.

After the coarse mating, at least a half of the pairs that are not mated are identified.

FINE MATING AND CALCULATION OF MATED POSSIBILITIES

In this embodiment, T1 is set at 10, θT at 30 degrees and DR at 30 degrees. Since DR is set at 30 degrees, the maximum rotation angle is limited to form −30 degrees to 30 degrees. Make every 20 degrees a section. Section between −30 and −10 degrees is represented by −20 degree, section between −10 and 10 degrees is represented by 0 degree and section between 10 and 30 degrees is represented by 20 degree. The supporting values under every section are calculated.

A. Mating of Pattern B and Pattern A:

From the coarse mating, flag [b1][a1]=1. We know b1 and a1 are a possible mated pair. Under such condition, the supporting value of b1 and a1 in each section is calculated. In other words, S[b1][a1][−20], S[b1][a1][0] and S[b1][a1][20] are calculated.

Supposing b1 and a1 are mated, the mated possibility of b2 and a2 is calculated, as follows:

(a) Distance condition:

$d1=|\overline{a_1a_2}-\overline{b_1b_2}|=|24-23|=1\leq T1=10$. The condition is satisfied.

(b) Rotation condition:

Rotation angle $\theta=\theta_{\overline{a1a2}}-\theta_{\overline{b1b2}}=0-22=-22$ and $|\theta|=22\leq\theta T=30$.

The condition is satisfied.

(c) Feature direction of the starting points:

$Ds=|(D_{a1}-\theta_{\overline{a1a2}})-(D_{b1}-\theta_{\overline{b1b2}})|=|0-(-2)|=2\leq DR=30$. The condition is satisfied.

(d) Feature direction of the end points:

$De=|(D_{a2}-\theta_{\overline{a1a2}})-(D_{b2}-\theta_{\overline{b1b2}})|=|23-21|=2\leq DR=30$. The condition is satisfied.

Since the above conditions are satisfied and θ=−22 degrees, within the −20 degree section,we set w=0.4, w1=w2=0 and have:

C1122[−20]=1.0/(1.0+w*d1)=1.0/(1.0+0.4*1)=0.71. Thus, C1122[0]=0 and C1122[20]=0.

Under the premise that b1 and a1 are mated, the supporting value to the mating of b1 and a1 in each section is also calculated. Inotherwords,S[b2][a3][−20], S[b2][a3][0]and S[b2][a3][20] are calculated, as follows:

(a) Distance condition:

$d1=|\overline{a_1a_3}-\overline{b_1b_2}|=|48-23|=25\leq T1=10$. The condition is satisfied.

(b) Rotation condition:

Rotation angle $\theta=\theta_{\overline{a1a3}}-\theta_{\overline{b1b2}}=0-22=-22$ and $|\theta|=22\leq\theta T=30$. The condition is satisfied.

(c) Feature direction of the starting points:

$Ds=|(D_{a1}-\theta_{\overline{a1a3}})-(D_{b1}-\theta_{\overline{b1b2}})|=|0-(-20|=2\leq DR=30$. The condition is satisfied.

(d) Feature direction of the end points:

$De=|(D_{a3}-\theta_{\overline{a1a3}})-(D_{b2}-\theta_{\overline{b1b2}})|=|45-21|=24\leq DR=30$. The condition is satisfied.

Among the above conditions, one is not satisfied. The supporting values in each section is set at 0 accordingly. We have:

C1123[−20]=0, C1123[0]=0 and C1123[20]=0.

The supporting values of all the other points are calculated. FIG. 10 illustrates the supporting values of points of Pattern A and points of Pattern B to the mating of a1 and b1.

The supporting value to b1 and a1 at section −20 degree is calculated:

S[b1][a1][−20]=0.71+0.55+1.0+0.71+0.45+1.0+1.0= 5.42.

The supporting values to b1 and a1 at sections 0 and 20 degree are 0. Thus, S[b1][a1][0]=0 and S[b1][a1][20]=0.

The mated possibility of b1 and a1 is calculated according to equation (12). The mated possibilities of every two points from the patterns are calculated likewise. The results are shown in FIGS. 11–13 for various rotation angles.

Mating of Pattern C and Pattern A

Mating of Patterns C and A is conducted in a similar way. FIGS. 14–16 illustrate the mated possibilities of every point in Pattern A and every point in Pattern C.

PRELIMINARY SELECTION OF MATED PAIRS p N pairs of mated pairs are selected according to the mated possibilities. For those can not be mated, the mated possibilities are replaced by 0.

A. Mating of Pattern B and Pattern A

First the greatest SMAX is selected. The rotation angle β is decided. From FIG. 11 we know SMAX=5.42 where β is −20 degree. 8 Pairs of mated points are selected according to their mated possibilities in sequence (N=8):

b1 and a1 are mated wherein op[1]=b1, oq[1]=a1 and sim[1]=5.42. The mated possibilities located in row 1 and column 1 are replaced by 0.

b2 and a2 are mated wherein op[2]=b2, oq[2]=a2 and sim[2]=4.19. The mated possibilities located in row 2 and column 2 are replaced by 0.

b3 and a3 are mated wherein op[3]=b3, oq[3]=a3 and sim[3]=2.64. The mated possibilities located in row 3 and column 3 are replaced by 0.

b4 and a4 are mated wherein op[4]=b1, oq[4]=a4 and sim[4]=2.00. The mated possibilities located in row 4 and column 4 are replaced by 0.

b6 and a6 are mated wherein op[5]=b6, oq[5]=a6 and sim[5]=1.87. The mated possibilities located in row 6 and column 6 are replaced by 0.

b5 and a5 are mated wherein op[6]=b5, oq[6]=a5 and sim[6]=1.54. The mated possibilities located in row 5 and column 5 are replaced by 0.

b7 and a7 are mated wherein op[7]=b6, oq[7]=a6 and sim[7]=1.27. The mated possibilities located in row 6 and column 6 are replaced by 0.

b8 and a8 are mated wherein op[8]=b8, oq[8]=a8 and sim[8]=0.26. The mated possibilities located in row 8 and column 8 are replaced by 0.

FIG. 17 illustrates the results of preliminary selection of Patterns B and A.

B. Mating of Pattern C and Pattern A

Pattern C and Pattern A are mated according to the above-said processes. FIG. 18 illustrates the results of preliminary selection of Patterns C and A. As shown in Table 8, SMAX=1.23 where β is −20 degree. 7 Mated pairs are selected (N=7).

SECOND SELECTION OF MATED PAIRS

In this embodiment, $d_1$ is set at 225 and $d_2$ at 150.

A. Mating of Pattern B and Pattern A

From the previous step, we have SMAX=5.42 so that G=5. 5 Mated pairs are selected and a transformation, (tx, ty, θ)=(−20.2, 28.6, −22.8 degrees), is obtained.

The transformation is used to adjust the coordinates of points in Pattern B. FIG. 19 illustrates the coordinates of Pattern B and the distance between the mated points after the transformation. As shown in the table, 8 mated pairs are with difference in distance smaller than $d_1$ so that M=8.

The 8 pairs are used to calculate the second transformation. We then have: (tx, ty, θ)=(−19.9, 26.7, −21.2 degrees). Pattern B is transformed again. FIG. 20 illustrates the coordinates of Pattern B and the distance between the mated points after the second transformation.

As shown in the table, among the mated pairs, 8 pairs are with distances less than $d_2$ (=150). Thus K=8. Now we have: diff=1.71 and md=2.398.

B. Mating of Pattern C and Pattern A

From Table 8 we have SMAX=1.23 so that G=2. 2 Mated pairs are selected to calculate the geometric transformation where (tx, ty, θ)=(5.33, 8.0, 0 degrees). The transformation is used to transform the coordinates of points in Pattern C. FIG. 21 illustrates the coordinations of Pattern C and the distance between the mated points after the transformation.

Among the mated pairs, 3 pairs are with distances less than $d_1$ (=255). Thus M=3.

The 3 pairs are used to calculate the second transformation. We then have: (tx, ty, θ)=( 5.33, 8.0, 0 degrees). Pattern C is transformed again. FIG. 22 illustrates the coordinates of Pattern C and the distance between the mated points after the second transformation.

Among the mated pairs, 3 pairs are with distances less than $d_2$ (=150). Thus K=3. Now we have: diff=3.77 and md=0.9733.

CALCULATION OF SIMILARITY

In this embodiment, C is set at 10000.0.

A. Matching of Pattern B and Pattern A

K=8,

S1=K/n=8/8=1,

S2=K/m=8/8=1, md=2.398, and

S3=1/(1+diff)=0.3688. Thus, Score=C*K*S1*S2*S3*md=70781.64.

B. Matching of Pattern C and Pattern A

K=3,

S1=K/n=3/8=0.375,

S2=K/m=3/8=0.375, md=0.97, and

S3=1/(1+diff)=0.2095. Thus, Score=C*K*S1*S2*S3*md=860.63.

DETERMINATION

In this embodiment the threshold to determine whether two patterns are similar is set at 5,000.0. While the similarity between Pattern B and Pattern A is 70781.64, Pattern B and Pattern A are considered similar. While the similarity between Pattern C and Pattern A is 860.63, Pattern C and Pattern A are considered not similar.

EFFECTS OF THE INVENTION

In order to prove the effects of this invention, 800 fingerprints are matched in a personal computer adopting the invented method and in a personal computer adopting the method disclosed in Taiwan patent application No. 79109743.

20 Fingerprints are input for one finger for up to 40 different fingers and totally 800 fingerprints are obtained. The coordinates and feature directions of the feature points (the end points and the cross points) are abstracted with the conventional art.

Every pattern obtained from a finger is matched with the other 19 patterns from same finger. Because there are 40 fingers, the number of matching is: 40*(20*19)=15,200 times. The Scores are recorded.

Every pattern obtained from a finger is matched with patterns from other fingers. The number of matching is: 800*780=624,000 times.

In total the number of matching is: 624,000+15,200=639,200 times.

Figures 23A, 23B:
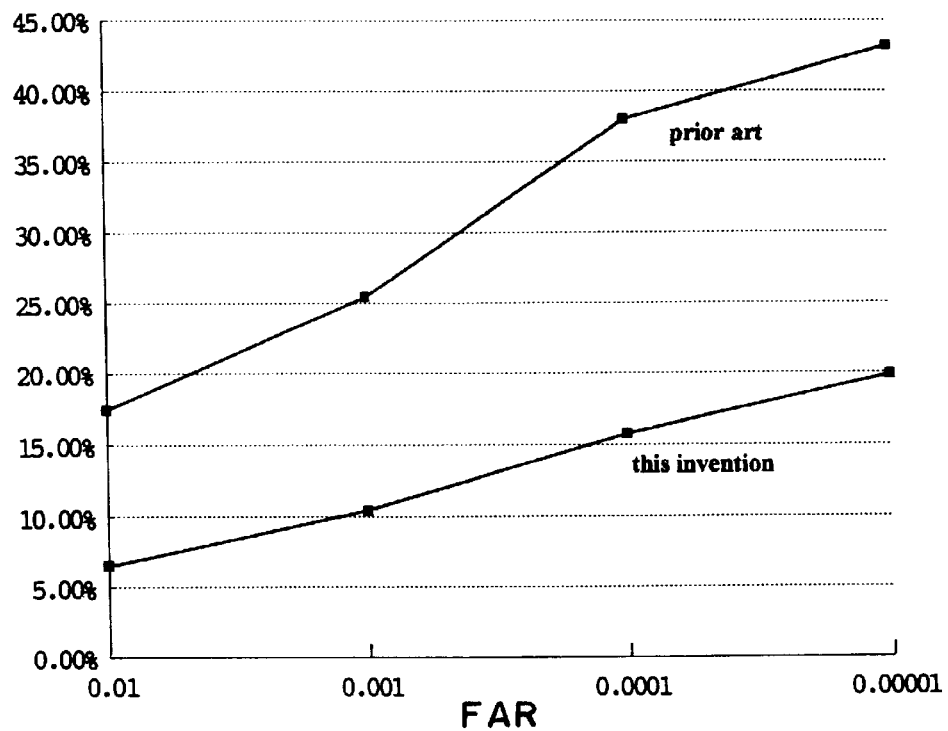
FIG. 23 illustrates the results of the matching of patterns of 800 fingerprints obtained from 40 fingers, as processed under this invention and under the conventional art.

FIGS. 23(a) and (b) illustrate the results of the matching of patterns of 800 fingerprints obtained from 40 fingers, as processed by the method of this invention and the method of the conventional art. As FIG. 23 shows, the FRR of this invention is higher than the prior art for at least two times.

When the matching is operated in a SPARC-10 work station, the total operation time is 9823 seconds. The average operation time for one matching is approximately 0.15 seconds. The speed is about 3 times higher than the method of Taiwan patent application No. 79109743.

The above description illustrates only the spirit of this invention. Those skilled in the art will be able to make various modifications and improvements within the spirit of this invention, but all such modifications and imporvements shall come under the scope of the present invention.

What is claimed is:

1. A method for automatic matching of planar point patterns to decide whether two patterns (P and q) consisting of points distributed in respective coordinate plans are similar;

wherein P={p1,p2, . . . pm} is a reference pattern including m points and Q={q1,q2, . . . qn} is a test pattern including n points and wherein every point of the pattern is expressed by (x,y,D) wherein (x, y) is the coordinate of the point and D is the feature direction of the point;

said method comprising:

a mating process to locate an only point pi in the P pattern for every point qj in the Q pattern thereby pi and qj are overlapped or within a very short distance from each other, if they were in a same coordinate plan;

a similarity calculation process to calculate the similarity of the two patterns according to the result of said mating process; and a determination process to determine whether the two patterns are similar by comparing the index of similarity with a threshold;

wherein said mating process comprises:

calculating the mated possiblity of every point in the Q pattern (qj, j=1, 2, ..., m) and every point in the P pattern (pi, i=1, 2, ..., n), comprising:

designating a point in the Q pattern (qj) to be mated with a point in the P pattern (pi);

calculating the mated possibility of every point, other than said qj point, in the Q pattern (qk, k=1, 2, ..., m. k≠j) to be mated with every point, other than said pi point, in the P pattern (ph, h=1, 2, ..., m, h≠i), under a transformation angle;

accumulating the mated possibilities of qk points and ph points under the premise that pi and qj are mated and making the result the mated possibility of qj and pi; and selecting the mated parts according to the values of mated possibility of qj points and pi points;

wherein the mated possibility of qj and pi while pattern Q is rotated at angle θ (S[i][j][θ]) is calculated according to the following equation:

$$S[i][j][\theta] = \sum_{h=1, h \neq i}^{m} \left\{ \max_{k=1, k \neq j}^{n} \{C_{ijhk}[\theta]\} \right\}$$

wherein:

$$C_{ijhk}[\theta] = \frac{1.0}{1.0 + w * dl + w_1 * Ds + w_2 * De}$$

wherein:

$C_{ijkh}(\theta)$ represents the mated possibility of qk (k=1, 2, ... m, k≠j) and ph (h=1, 2, ..., h≠i), θ=θqjqk−θpiph, Ds represents the difference between the difference between the feature direction of pi and the direction of $\overline{piph}$ and the difference between the feature direction of qj and the direction of $\overline{qiqk}$, De represents the difference between the difference between the feature direction of ph and the direction of $\overline{piph}$ and the difference between the feature direction of qk and the direction of $\overline{qiqk}$, d1 represents the difference between the lengths of $\overline{piph}$ and $\overline{qiqk}$, and w, w1 and w2 are constants; and wherein the similarity value (Score) of the two patterns is calculated according to the following equation:

Score=C*K2*$S_1$*$S_2$*$S_3$*md, wherein

C is a constant;

K is the number of mated pairs;

$S_1$ is the mated rate of the reference pattern, K/n;

$S_2$ is the mated rate of the test pattern, K/m;

md is the average mated possibility of all the mated pairs; and $S_3$=1.01(1.0+average distance of the mated points).

wherein the planar point patterns are automatically matched based upon said similarity value (Score) of the two patterns.

2. The method according to claim 1 wherein said reference pattern and said test pattern are abstracted from planar image files and are the terminal points or cross points of lines or curves in said planar image; wherein said feature direction represents the tangent direction of said line or curve while the corresponding point is a terminal point and represents the bisector direction of said line or curve while the corresponding point is a cross point; and wherein said feature direction is the angle between it and the horizontal direction.

3. The method according to claim 1 or 2 further comprising a coarse mating process before the mating process wherein said coarse mating process comprises:

setting maximum tolerances for the difference in the feature directions and distance between points to be mated supposing said points are in a same coordinate; and determining a pair of points belonging to respective patterns not mated if the difference of their feature directions or the distance thereof is greater than said maximum tolerances.

4. The method according to claim 3 wherein the Cijhk(θ) of said pair of points is set to 0 if said points are determined not mated and wherein S[i][j][θ] is set to be 0 if Cijhk(θ) is 0.

5. The method according to claim 4 wherein w1 and w2 are both 0.

6. The method according to claim 3 further comprising a fine mating process before said mating process, comprising:

setting at least one requirement for mated points; and determining pairs of points qk and ph to be not mated and the $C_{ijhk}$ thereof to be 0 if said at least one requirement is not satisfied;

wherein said at least one requirement comprises:

distance requirement T1: d1<=T1;

rotation requirement θT: |θ|<=θT;

direction requirement for starting points DR: Ds<=DR; and direction requirement for ending points DR: De<=DR.

7. The method according to claim 1, further comprising an adjustment process after said mating process, wherein said adjustment process comprises:

obtaining a transformation (tx, ty, θ) such that function E(tx, ty, θ) will be the minimum;

transforming said test pattern with said transformation; and mating the at least two pairs of points of the pattern according to the result of said transformation;

wherein:

$x_{qj}$=tx+$x_{pi}$cos θ−$y_{pi}$ sin θ, $Y_{qj}$=tx+$x_{pi}$ sin θ−$y_{pi}$ cos θ, and $D_{qj}$=($D_{pi}$+Dr)+θ;

wherein ($x_{pi}$ $y_{pi}$) and ($x_{qj}$ $y_{qj}$) represent coordinates of pi and qj, $D_{pi}$ and $D_{qj}$ represent the feature directions of pi and qj respectively, and Dr is the difference between the feature directions of pi and qj after the transformation; and $$E(tx, ty, \theta) = \sum_{i=1}^{G} (x_{op[i]} - x'_{op[i]})^2 - (Y_{op[i]} - y'_{op[i]})^2$$

wherein x'$_{op[i]}$=tx+$x_{op[i]}$cos θ−$y_{op[i]}$sin θ represents the x coordinate of op[i] being transformed by E(tx, ty, θ); and y'$_{op[i]}$=tx+$x_{op[i]}$ sin θ+$y_{op[i]}$ cos θ represents the y coordinate of opfil being transformed by E(tx, ty, θ); and op[i] represents the G reference pattern points belonging to mated pairs with the highest mating possibilities; and G is a predetermined value greater than or equal to 4.

8. The method according to claim 7 wherein said adjustment process is applied to the G pairs of points and wherein pairs of points with distances exceeding a decided value are determined not mated.

9. The method according to claim 8 wherein the adjustment process is operated at least two times.

10. The method according to claim 7 wherein the adjustment process is operated at least two times.

11. A device for automatic matching of planar point patterns to decide whether two patterns (P and Q) consisting of points distributed in respective coordinate plans are similar wherein P={p1,p2, . . . pm} is a reference pattern including m points and Q={q1,q2, . . . qn} is a test pattern including n points and wherein every point of the pattern is expressed by (x,y,D) wherein (x, y) is the coordinate of the point and D is the feature direction of the point;

said device comprising:
a mating means to identify an only point (pi) in the P pattern for every point in the Q pattern, according to the coordinates and feature directions of the points;
a similarity calculation means to calculate the similarity of the two patterns according to the result of said mating process; and
a determination means to determine whether the two patterns are similar by comparing the result of said similarity calculation with a threshold;

wherein mating of said mating means comprises:
calculating the mated possibility of every point in the Q pattern (qj, j=1, 2, . . . , m) and every point in the P pattern (pi, i=1, 2, . . . , n), comprising:
designating a point in the Q pattern (qj) to be mated with a point in the P pattern (pi);
calculating the mated possibility of every point, other than said qj point, in the Q pattern (qk, k=1, 2, . . . , m. k≠j) to be mated with every point, other than said pi point, in the P pattern (ph. h=1, 2, . . . , m, h≠i), under a transformation angle; and
accumulating the mated possibility of qk points anci pn points under the premise that pi and qj are mated and making the result the mated possibility of qj and pi; and
selecting the mated parts according to the values of mated possibility of qj points and pi points;

wherein said mating means calculates the mated possibility of aj and pi while pattern Q is rotated at angle θ(S[i][j][θ]) according to the following equation:

$$S[i][j][\theta] = \sum_{h=1,h\neq i}^{m} \left\{ \max_{k=1,k\neq j}^{n} \{C_{ijhk}[\theta]\} \right\}$$

wherein:

$$C_{ijhk}[\theta] = \frac{1.0}{1.0 + w*dl + w_1*Ds + w_2*De}$$

wherein:
$C_{ijkh}(\theta)$ represents the mated possibility of qk (k=1, 2, . . . , m, k≠j) and ph (h=1, 2, . . . , n h≠i), θ=θ$\overline{qjqk}$−θ$\overline{piph}$, Ds represents the difference between the difference between the feature direction of pi and the direction of $\overline{piph}$ and the difference between the feature direction of qj and the direction of $\overline{qiqk}$, De represents the difference between the difference between the feature direction of ph and the direction of $\overline{piph}$ and the difference between the feature direction of qk and the direction of $\overline{qiqk}$, d1 represents the difference between the lengths of $\overline{piph}$ and $\overline{qiqk}$, and w, w1 and w2 are constants; and wherein the similarity value calculation device calculates the similarity value (Score) of the two patterns is calculated according to the following equation:

Score=C*K*S$_1$* S$_3$*md, wherein
C is a constant;
K is the number of mated pairs;
S$_1$ is the mated rate of the reference pattern, K/n;
S$_2$ is the mated rate of the test pattern, K/m;
md is the average mated possibility of all the mated pairs; and
S$_3$=1.0/(1.0 +average distance of the mated points).

wherein the planar point patterns are automatically matched based upon said similarity value (Score) of the two patterns.

12. The device according to claim 11 wherein said reference pattern and said test pattern are abstracted from planar image files and are the terminal points or cross points of lines or curves in said planar image; wherein said feature direction represents the tangent direction of said line or curve while the corresponding point is a terminal point and represents the bisector direction of said line or curve while the corresponding point is a cross point; and wherein said feature direction is the angle of it and the horizontal direction.

13. The device according to claim 11 or 12 further comprising a coarse mating means to determine whether a point of said pattern P and a point of said pattern Q are not mated wherein the determination of said coarse mating means comprises:

setting maximum tolerances for the difference in the feature directions and distance between points to be mated supposing said points are in a same coordinate; and determining a pair of points belonging to respective patterns not mated if the difference of their feature directions or the distance thereof is greater than said maximum tolerances.

14. The device according to claim 13 wherein said coarse mating means sets the Cijhk(θ) of a pair of points to be 0 if they are determined not mated and wherein the S[i][j][θ] is set to 0 if Cijhk(θ) is 0.

15. The device according to claim 14 wherein w1 and w2 are both 0.

16. The device according to claim 13 further comprising a fine mating means to determine whether Cijhk(θ) is 0, said determination comprising:

setting at least one requirement for mated points; and
determining pairs of points qk and ph to be not mated and the $C_{ijhk}$ thereof to be 0 if said at least one requirement is not satisfied;

wherein said at least one requirement comprises:
distance requirement T1: d1<=T1;
rotation requirement θT: |θ|<=θT;
direction requirement for starting points DR: Ds<=DR; and
direction requirement for ending points DR: Ds<=DR.

17. The device according to claim 11 or 12, further comprising an adjustment process to transform said pattern Q after said mating, said transformation comprising:

obtaining a transformation (tx,ty,θ) such that function E(tx,ty,θ) has the least value;
transforming said test pattern with said transformation; and mating the pattern according to the result of said transformation;

wherein:

$x_{qj} = tx + x_{pi} \cos\theta - y_{pi} \sin\theta,$
$Y_{qj} = tx + x_{pi} \sin\theta - y_{pi} \cos\theta,$ and
$D_{qj} = (D_{pi} + Dr) + \theta;$ wherein $(x_{pi}, y_{pi})$ and $(x_{qj}, y_{qj})$ represent coordinates of pi and qj, $D_{pi}$ and $D_{qj}$ represent the feature directions of pi and qj respectively, and Dr is the difference between the feature directions of pi and qj after the transformation; and $$E(tx, ty, \theta) = \sum_{i=1}^{G} (x_{op[i]} - x'_{op[i]})^2 - (Y_{op[i]} - y'_{op[i]})^2;$$

wherein $x'_{op[i]} = tx + x_{op[i]} \cos\theta - y_{op[i]} \sin\theta$ represents the x coordinate of op[i] being transformed by $E(tx,ty,\theta)$;

$y'_{op[i]} = tx + x_{op[i]} \sin\theta + y_{op[i]} \cos\theta$ represents the y coordinate of op[i] being transformed by $E(tx,ty,\theta)$; and op[i] represents the G reference pattern points belonging to mated pairs with the highest mating possibilities; and G is a predetermined value greater than or equal to 4.

18. The device according to claim 17 wherein said adjustment means transforms G points of said pattern Q and determines pairs of points with distances exceeding a decided value not mated.

* * * * *